(12) United States Patent
Iwahashi

(10) Patent No.: US 8,752,122 B2
(45) Date of Patent: Jun. 10, 2014

(54) TELEVISION RECEIVING DEVICE AND POWER SUPPLY CONTROL METHOD

(75) Inventor: Toshiya Iwahashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1493 days.

(21) Appl. No.: 11/853,913

(22) Filed: Sep. 12, 2007

(65) Prior Publication Data

US 2008/0062333 A1 Mar. 13, 2008

(30) Foreign Application Priority Data

Sep. 12, 2006 (JP) .................................. 2006-246976

(51) Int. Cl.
*H04N 7/16* (2011.01)
*H04N 5/63* (2006.01)

(52) U.S. Cl.
USPC .................. 725/151; 725/10; 725/11; 725/12; 348/730

(58) Field of Classification Search
None
See application file for complete search history.

(56) References Cited

U.S. PATENT DOCUMENTS

| | | | |
|---|---|---|---|
| 5,194,951 A * | 3/1993 | Hailey et al. .................. 348/581 |
| 7,562,376 B2 * | 7/2009 | Matsuzaki ...................... 725/43 |
| 2001/0020940 A1 * | 9/2001 | Nakazato et al. ............. 345/418 |
| 2005/0066208 A1 * | 3/2005 | Koie et al. ..................... 713/320 |
| 2005/0229226 A1 * | 10/2005 | Relan et al. ................... 725/114 |
| 2005/0235168 A1 * | 10/2005 | Nonaka et al. ................ 713/300 |
| 2005/0270422 A1 * | 12/2005 | Hsieh ............................ 348/553 |
| 2006/0007225 A1 * | 1/2006 | Kim ............................... 345/211 |
| 2006/0097885 A1 * | 5/2006 | Sengupta et al. .......... 340/636.1 |
| 2006/0132437 A1 * | 6/2006 | Kim ............................... 345/157 |
| 2007/0122140 A1 * | 5/2007 | Ito et al. ........................ 396/301 |
| 2007/0268403 A1 * | 11/2007 | Oda et al. ...................... 348/460 |
| 2008/0212884 A1 * | 9/2008 | Oneda et al. .................. 382/232 |

FOREIGN PATENT DOCUMENTS

| | | |
|---|---|---|
| JP | 2-224107 A | 9/1990 |
| JP | 11-284934 A | 10/1999 |
| JP | 2000-092743 A | 3/2000 |
| JP | 2000-244844 A | 9/2000 |
| JP | 2003-131760 A | 5/2003 |
| JP | 2004-96136 A | 3/2004 |
| JP | 2004-349946 A | 12/2004 |

OTHER PUBLICATIONS

Notice of Reason for Refusal of corresponding Japanese Application No. 2006-246976 dated Aug. 2, 2011.

* cited by examiner

*Primary Examiner* — Mushfikh Alam
(74) *Attorney, Agent, or Firm* — Global IP Counselors, LLP

(57) ABSTRACT

A television receiving device includes an operating mode determining unit and a power supply control unit. The operating mode determining unit is configured to determine an operating mode of the television receiving device. The power supply control unit is configured to automatically turn off the television receiving device when a default time elapses. The power supply control unit is further configured to change the default time to a modified time that is shorter than the default time based on the operating mode determined by the operating mode determining unit.

5 Claims, 7 Drawing Sheets

```
┌─────────────────────────────────────────┐
│                                         │
│                                         │
│                                         │
│             DISPLAY SCREEN              │
│                                         │
│                                         │
│                                         │
│  ┌──────┐                               │
│  │ 4:59 │  REMAINING UNTIL POWER SUPPLY IS SWITCHED OFF │
│  └──────┘                               │
└─────────────────────────────────────────┘
```

TELEVISION RECEIVING DEVICE AND POWER SUPPLY CONTROL METHOD

CROSS-REFERENCE TO RELATED APPLICATIONS

This application claims priority to Japanese Patent Application No. 2006-246976 filed on Sep. 12, 2006. The entire disclosure of Japanese Patent Application No. 2006-246976 is hereby incorporated herein by reference.

BACKGROUND OF THE INVENTION

1. Field of the Invention

The present invention relates to a television receiving device. More specifically, the present invention relates to a television receiving device having an automatic power supply OFF function.

2. Background Information

A conventional television receiving device includes an automatic power supply OFF function. The automatic power supply OFF function automatically switches a power supply OFF when a predetermined time has elapsed without any operation being performed in a state in which the power supply is ON (see Japanese Laid-Open Patent Application No. 2000-92743, for example). With the automatic power supply OFF function, the power supply is automatically switched OFF after a period of 3 hours has elapsed even if the user falls asleep while watching a movie or the like late at night.

Another conventional television receiving device includes an improved automatic power supply OFF function (see Japanese Laid-Open Patent Application No. 11-284934, for example). The automatic power supply OFF function does not abruptly switch the power supply OFF when the predetermined time has elapsed, but first lowers the audio output level. The automatic power supply OFF function determines that the user is no longer watching when an operating unit is not operated within a predetermined time after the audio output level has been lowered. Then, the automatic power supply OFF function switches the power supply OFF.

Another conventional television receiving device displays a message onscreen when it is determined that the user is watching the television outside a normal viewing time band. The message prompts the user to confirm whether the user wishes to continue watching the television. Then, the television receiving device switches off the power supply automatically if the user does not respond within a predetermined time (see Japanese Laid-Open Patent Application No. 2004-349946, for example).

Yet another conventional television receiving device includes a setting value holding unit. The setting value holding unit holds a predetermined time until the television receiving device is switched OFF (see Japanese Laid-Open Patent Application No. 2000-244844, for example).

In the automatic power supply OFF function of Japanese Laid-Open Patent Application No. 2000-92743, the power supply is switched OFF only when the predetermined time (e.g., 3 hours) has elapsed without any operation being performed while the power supply is ON. Accordingly, even if the user is not watching at some intermediate point, the power supply is not switched OFF until the predetermined time has elapsed.

The automatic power supply OFF function of Japanese Laid-Open Patent Application No. 11-284934 informs the user that the default time has elapsed before the power supply is switched OFF. However, this is irrelevant unless the user is already in front of the conventional television receiving device when the automatic power supply OFF function informs. Accordingly, the power supply is not switched OFF until the default time has elapsed.

With the conventional television receiving device of Japanese Laid-Open Patent Application No. 2004-349946, when there is a departure from an ordinary television viewing time band, the television power supply is switched OFF. However, if a state in which the user is not watching occurs in the ordinary television viewing time band, the television power supply is not switched OFF.

With the conventional television receiving device of Japanese Laid-Open Patent Application No. 2000-244844, the predetermined time can be set as desired by the user. However, even if there is a continued state in which the user is not watching before the predetermined time has elapsed, the television power supply is not switched OFF.

In view of the above, it will be apparent to those skilled in the art from this disclosure that there exists a need for an improved television receiving device. This invention addresses this need in the art as well as other needs, which will become apparent to those skilled in the art from this disclosure.

SUMMARY OF THE INVENTION

It is an object of the present invention to provide a television receiving device with which wasteful power consumption is more effectively saved.

In accordance with one aspect of the present invention, a television receiving device includes an operating mode determining unit and a power supply control unit. The operating mode determining unit is configured to determine an operating mode of the television receiving device. The power supply control unit is configured to automatically turn off the television receiving device when a default time elapses. The power supply control unit is further configured to change the default time to a modified time that is shorter than the default time based on the operating mode determined by the operating mode determining unit.

With the television receiving device, it is possible to provide a television receiving device with which wasteful power consumption is more effectively saved.

These and other objects, features, aspects and advantages of the present invention will become apparent to those skilled in the art from the following detailed descriptions, which, taken in conjunction with the annexed drawings, disclose selected embodiments of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
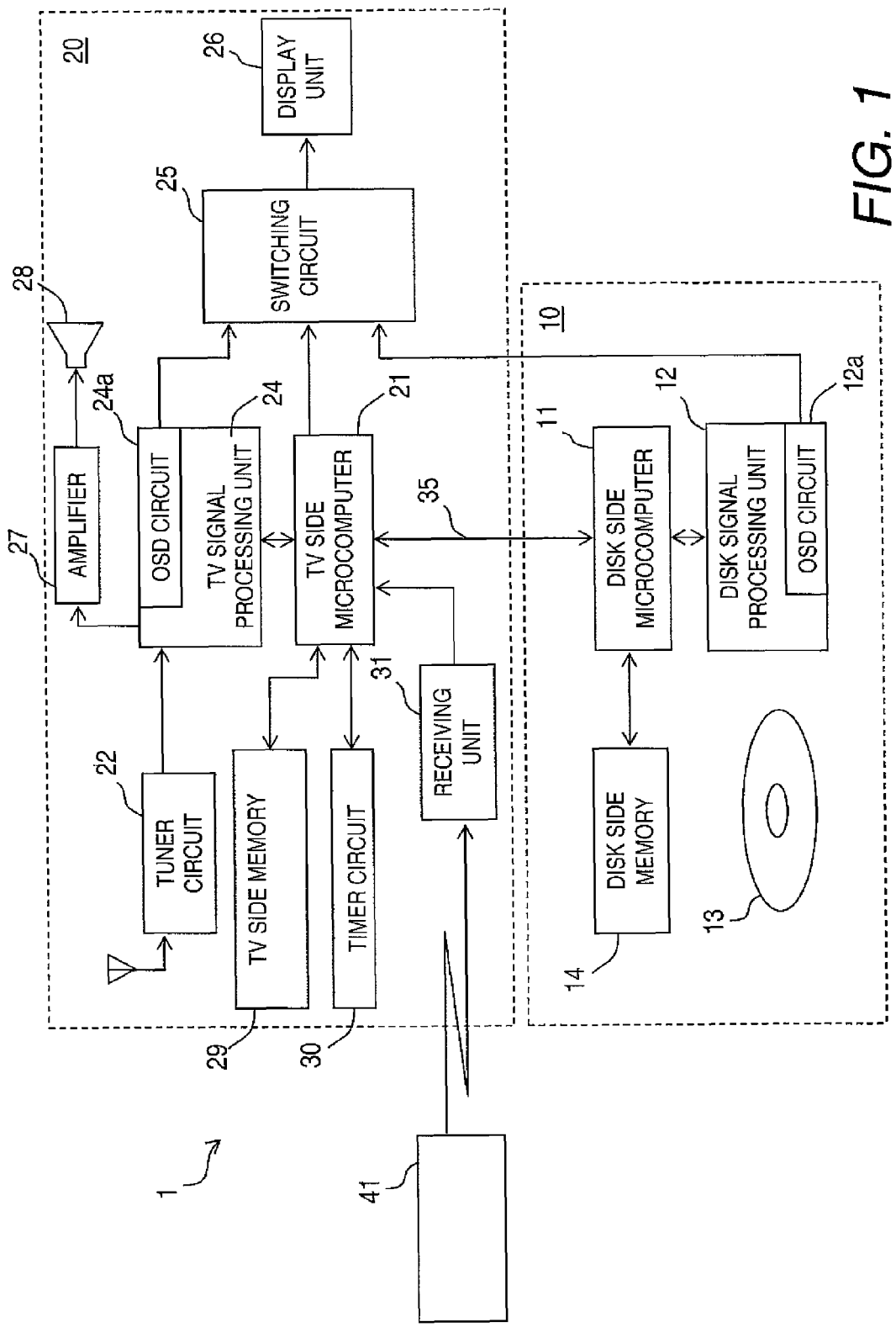
FIG. 1 is a functional block diagram of a television receiving device pertaining to a first embodiment of the present invention.

A first embodiment of the present invention will now be described through reference to FIGS. 1 to 4. As shown in FIG. 1, a television receiving device 1 includes a disk control system 10 and a TV control system 20. The disk control system 10 is an internal disk device (DVD device) which plays back a disk 13. The TV control system 20 is functionally connected to the disk control system 10. The disk control system 10 and the TV control system 20 are accommodated inside a housing of the television receiving device 1.

The disk control system 10 includes a disk side microcomputer 11, a disk signal processing unit 12 and a disk side memory 14. The TV control system 20 includes a TV side microcomputer 21, a tuner circuit 22, a TV signal processing unit 24, a switching circuit 25, a display unit 26, an amplifier 27, an internal speaker 28, a TV side memory 29, a timer circuit 30 and a receiving unit 31.

The disk side microcomputer 11 controls the disk control system 10. The disk side microcomputer 11 is connected to the TV control system 20 in both directions via bus communication 35. The disk side microcomputer 11 controls the disk signal processing unit 12. The disk signal processing unit 12 performs a decision process for determining a type of the disk 13 that is loaded in the disk control system 10. The disk signal processing unit 12 further performs a disk playback processing according to the type of the disk 13. The disk playback processing constitutes a conventional processing. An output of the disk signal processing unit 12 is connected to the display unit 26 such as a CRT display, an LCD display, or the like via the switching circuit 25. Furthermore, the disk signal processing unit 12 includes an OSD circuit 12a. The OSD circuit 12a is used to display various types of setting screens (menu screens) including a set-up screen that is used to make various types of settings on the side of the disk control system 10.

The disk side memory 14, such as an EEPROM or the like, stores settings set with the set-up screen, and settings transmitted from the TV side microcomputer 21.

The TV side microcomputer 21 controls the TV control system 20. The tuner circuit 22 receives television signals. An output of the tuner circuit 22 is connected to the TV signal processing unit 24. A video output of the TV signal processing unit 24 is connected to the display unit 26 via the switching circuit 25. Furthermore, an audio output of the TV signal processing unit 24 is connected to the internal speaker 28 via the amplifier 27. The TV signal processing unit 24 is controlled by the TV side microcomputer 21. The TV signal processing unit 24 performs a conventional video and audio signal processing. As a result, the TV signal processing unit 24 displays video signals on the display unit 26, and outputs audio signals from the internal speaker 28. Furthermore, the TV signal processing unit 24 includes an OSD circuit 24a. The OSD circuit 24a is used to display various types of menu screens including a set-up screen that is used to make various settings on the side of the TV control system 20 and a set-up screen that is used to make various settings on the side of the disk control system 10.

The TV side memory 29, such as an EEPROM or the like, stores settings set with the set-up screen. The timer circuit 30 measures various set times. The receiving unit 31 receives various types of operating signals from a remote control 41 of the television receiving device 1. An output of the receiving unit 31 is connected to the TV side microcomputer 21.

The TV side microcomputer 21 performs operating control of the disk side control system 10 and the TV side control system 20 based on the operating signals that are transmitted from the remote control 41. Specifically, all of the control signals including power supply ON and OFF signals of the disk control system 10 are transmitted to the disk side microcomputer 11 via the TV side microcomputer 21. Furthermore, a switching control of the switching circuit 25 is also performed by the TV side microcomputer 21.

The television receiving device 1 has an automatic power supply OFF function. The automatic power supply OFF function automatically switches power supply of the television receiving device 1 OFF when a default time (e.g. 3 hours) has elapsed without any operation being performed by the remote control 41 while the power supply is ON. The default time is set in advance as a time until the power supply is switched OFF. The automatic power supply OFF function is executed by the TV side microcomputer 21.

Figure 2:
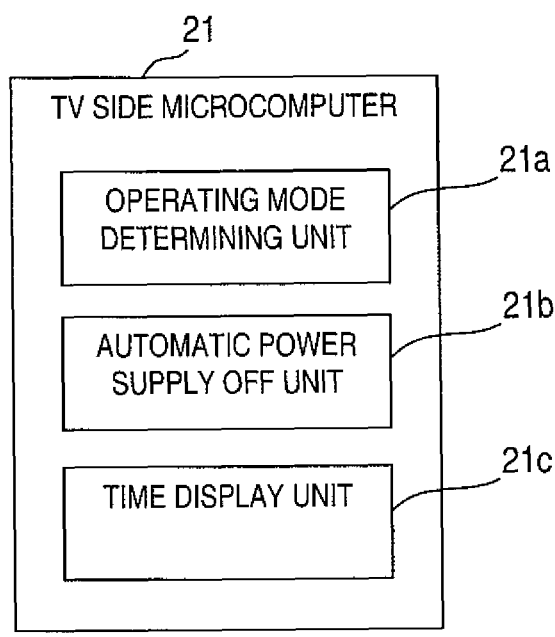
FIG. 2 is a block diagram showing a functional configuration of a TV side microcomputer pertaining to the first embodiment of the present invention.

FIG. 2 is a block diagram showing a functional configuration of the TV side microcomputer 21. As shown in FIG. 2, the TV side microcomputer 21 includes an operating mode determining unit 21a, an automatic power supply OFF unit (or a power supply control unit) 21b and a time display unit 21c. These units are implemented by a program executed by the TV side microcomputer 21.

The operating mode determining unit 21a determines an operating mode of the television receiving device 1 while the power supply is ON. Specifically, the operating mode determining unit 21a determines if the operating mode is shifted from an ordinary operating mode to a specified mode. The ordinary operating mode is an operating mode in which the television receiving device 1 outputs video and audio. More specifically, the ordinary operating mode is a mode in which the television receiving device 1 outputs the video and the audio which are being broadcasted and received in real time. The specified mode is an operating mode other than the ordinary operating mode. More specifically, the specified mode is an operating mode in which there is little possibility of long-term non-operation. For example, the specified mode includes a menu screen display mode, an audio mute mode and a still image display mode. The menu screen display mode is a mode that is used to display various types of setting screens on the display unit 26 based on an operation of the remote control 41. The audio mute mode is a mode to mute the audio output. The audio mute mode is activated by the operation of a mute button on the remote control 41. The still image display mode is a mode to display a still image on the display unit 26. The still image display mode is activated by the operation of a pause button on the remote control 41 when the disk control system 10 performs the disk playback process. The specified mode may further include other modes in which there is little possibility of long-term non-operation.

Figure 4:
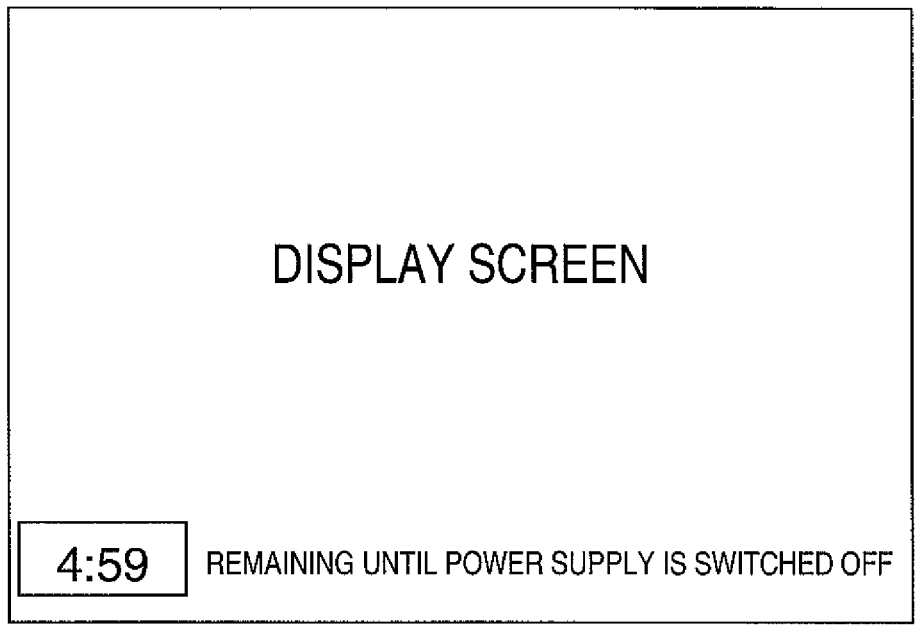
FIG. 4 is an explanatory diagram of a display of a time remaining until power supply is switched OFF.

The automatic power supply OFF unit 21b automatically turns off the television receiving device 1 when the default time has elapsed without any operation being performed by the remote control 41 while the power supply is ON. Furthermore, the automatic power supply OFF unit 21b changes the default time to a modified time when the operating mode determining unit 21a determines that the operating mode is shifted from the ordinary operating mode to the specified mode. The modified time is shorter (e.g., 5 minutes) than the default time. Then, the automatic power supply OFF unit 21b continues to execute the automatic power supply OFF function with the modified time. The time display unit 21c displays a remaining time remaining until the television receiving device 1 is automatically turned off on the screen of the display unit 26 as shown in FIG. 4. The automatic power supply OFF function is always started (or initiated) when the power supply is switched ON. The user sets the automatic power supply OFF function when the power supply is ON in advance with a special button which is disposed on the menu screen or the remote control 41.

Figure 3:
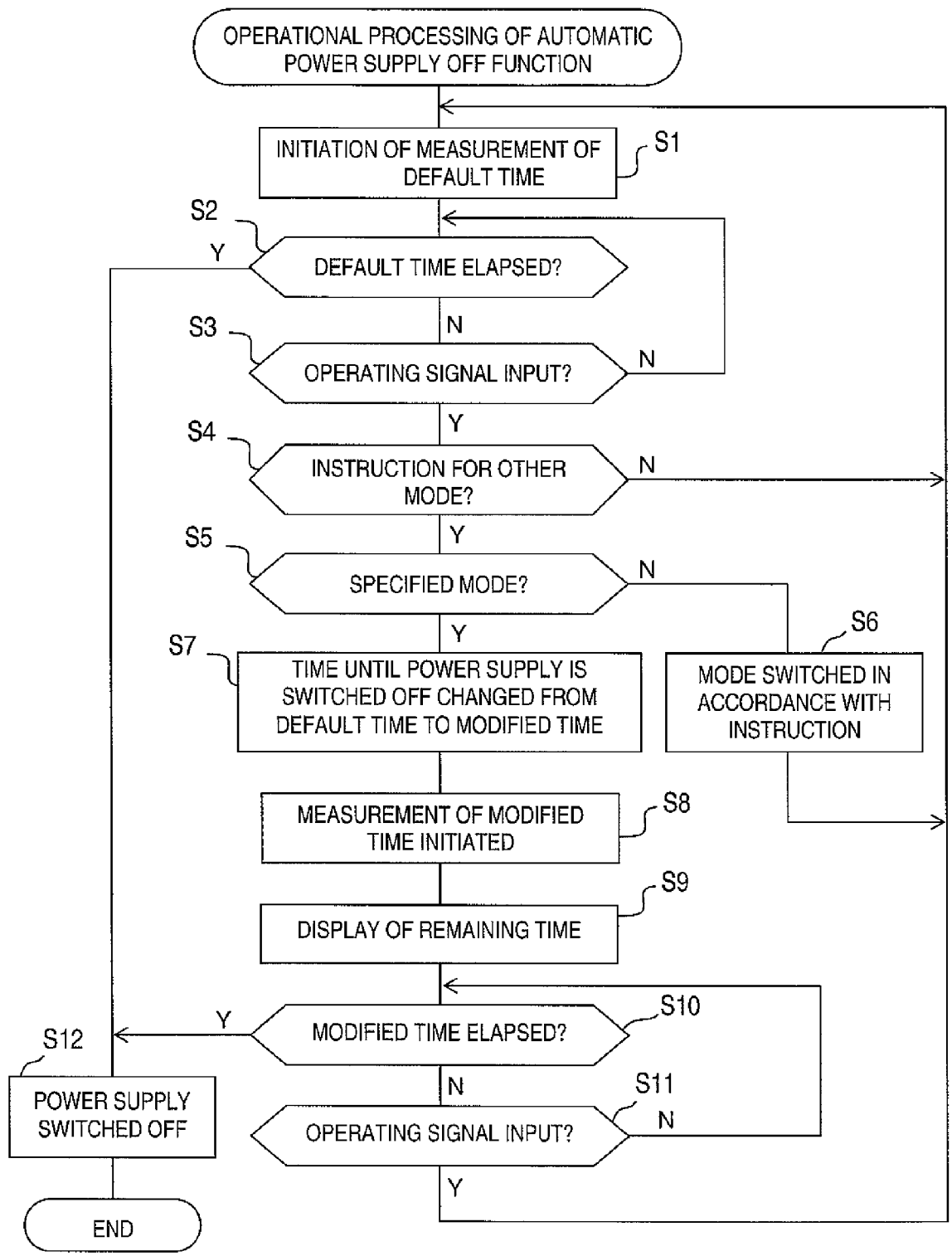
FIG. 3 is a flow chart illustrating an operation of an automatic power supply OFF function pertaining to the first embodiment of the present invention.

The automatic power supply OFF function will be described with reference to a flow chart shown in FIG. 3.

When the automatic power supply OFF function is started, the automatic power supply OFF unit 21b starts the timer circuit 30, and begins to measure the default time (e.g., 3 hours) (steps S1, S2). Here, it is assumed that the operating mode when the power supply is ON is the ordinary operating mode. In this case, the automatic power supply OFF unit 21b is in a state of waiting for operating signals from the remote control 41 (step S3). When an operating signal is input (received by the receiving unit 31) (i.e., when a judgment of YES is made in step S3), the operating mode determining unit 21a determines whether or not an instruction based on the operating signal is an instruction to switch to another operating mode from the ordinary operating mode (step S4). If there is no instruction to switch to the other operating mode, and an instruction for adjusting audio volume or the like is merely made, for example, when a judgment of NO is made in step S4, the processing returns to step S1. Then, the timer circuit 30 is temporarily reset, and the measurement of the default time is again initiated.

On the other hand, when the instruction based on the operating signal is an instruction to switch to the other operating mode (i.e., when a judgment of YES is made in step S4), the operating mode determining unit 21a determines whether or not the other operating mode is the specified mode (step S5).

If the other operating mode is not the specified mode (i.e., when a judgment of NO is made in step S5), a switch is made to the other operating mode designated by the instruction, and processing is performed (step S6). Then, the processing returns to step S1. After that, the timer circuit 30 is temporarily reset, and the measurement of the default time is again initiated.

On the other hand, if the other operating mode is the specified mode (i.e., when a judgment of YES is made in step S5), the automatic power supply OFF unit 21b changes the default time to the modified time. Specifically, the automatic power supply OFF unit 21b changes the time until the power supply is switched OFF by the automatic power supply OFF function from the default time of 3 hours to the modified time that is shorter than the default time, e.g., 5 minutes (step $7). In other words, the automatic power supply OFF unit 21b resets the timer circuit 30, and re-initiates the measurement of a time of 5 minutes (step S8).

Furthermore, from this point in time, the time display unit 21c displays a remaining time remaining until the power supply is switched OFF on the screen of the display unit 26 (step S9). For example, the display of the remaining time shows the remaining time counted down in real time in units of 1 second from 5 minutes, i.e., 4 minutes 59 seconds, 4 minutes 58 seconds, . . . , 0 minutes 03 seconds, 0 minutes 02 seconds, 0 minutes 01 seconds. Alternatively, for example, the remaining time may be displayed in units of 30 seconds, e.g., 4 minutes 30 seconds, 4 minutes 00 seconds, 3 minutes 30 seconds, . . . and so on. As a result of such a display being performed, the user knows how many seconds remain until the power supply will be switched OFF when the user has finished attending to other matters and returns to a position in front of the television receiving device. Accordingly, the user can perform the next operation before the remaining time reaches 0 seconds.

The automatic power supply OFF unit 21b continues to measure the modified time while the time display unit 21c performs such a display of the remaining time (step S10). Furthermore, the automatic power supply OFF unit 21b monitors whether or not an operating signal is input within the measured time (step S11). If an operating signal is input within the measured time (i.e., when a judgment of NO is made in step S10, and a judgment of YES is made in step S11), processing according to the operating signal is performed. Then, the processing returns to step S1. After that, the timer circuit 30 is reset, and the measurement of the default time of 3 hours is again initiated.

On the other hand, if the modified time of 5 minutes is measured without any operating signal being input (i.e., when a judgment of YES is made in step S10), the automatic power supply OFF unit 21b switches the power supply OFF (step S12). Specifically, if no operation is performed after the operating mode is shifted to the specified mode, the power supply is automatically switched OFF after 5 minutes.

With the television receiving device 1, the default time until the power supply is switched OFF by the automatic power supply OFF function is changed to an appropriate time without causing the user to feel any inconvenience. This is accomplished by determining whether or not the user is present in front of the television receiving device 1 based on the operating modes of the television receiving device 1 and the operating times of the operating modes.

Specifically, when the operating mode is switched to the menu screen display mode, it is difficult to envision that the user will not perform any operation for a long period of time with the menu screen displaying. The menu screen is displayed because the user wishes to perform some type of operation. It is conceivable that a lack of any operation in this state may occur when some unexpected event occurs, and the user leaves the room where the television receiving device 1 is installed without operating the menu screen.

Furthermore, it is also difficult to envision circumstances in which the user views the television for a long period of time in the audio mute mode. It is conceivable that a lack of any operation in this state may occur when there is a telephone call during viewing, and the user temporarily mutes the audio but then leaves the room without operating the television receiving device 1 in order to continue the call.

Furthermore, when the user displays a still image in the still image display mode during the playback of a recorded movie in order to perform other duties, it may be assumed that the user will soon return. Accordingly, it is difficult to envision that the device will be left in the still image display mode for a long period of time.

Accordingly, if the operating mode has been shifted to the specified mode, the automatic power supply OFF unit 21b changes the default time to the modified time. Then, if no operation is performed during the modified time, it is judged that the user is not present in front of the television receiving device. Therefore, the power supply is automatically switched OFF after the modified time has elapsed. As a result, wasteful power consumption is more effectively minimized.

Second Embodiment

Figure 5:
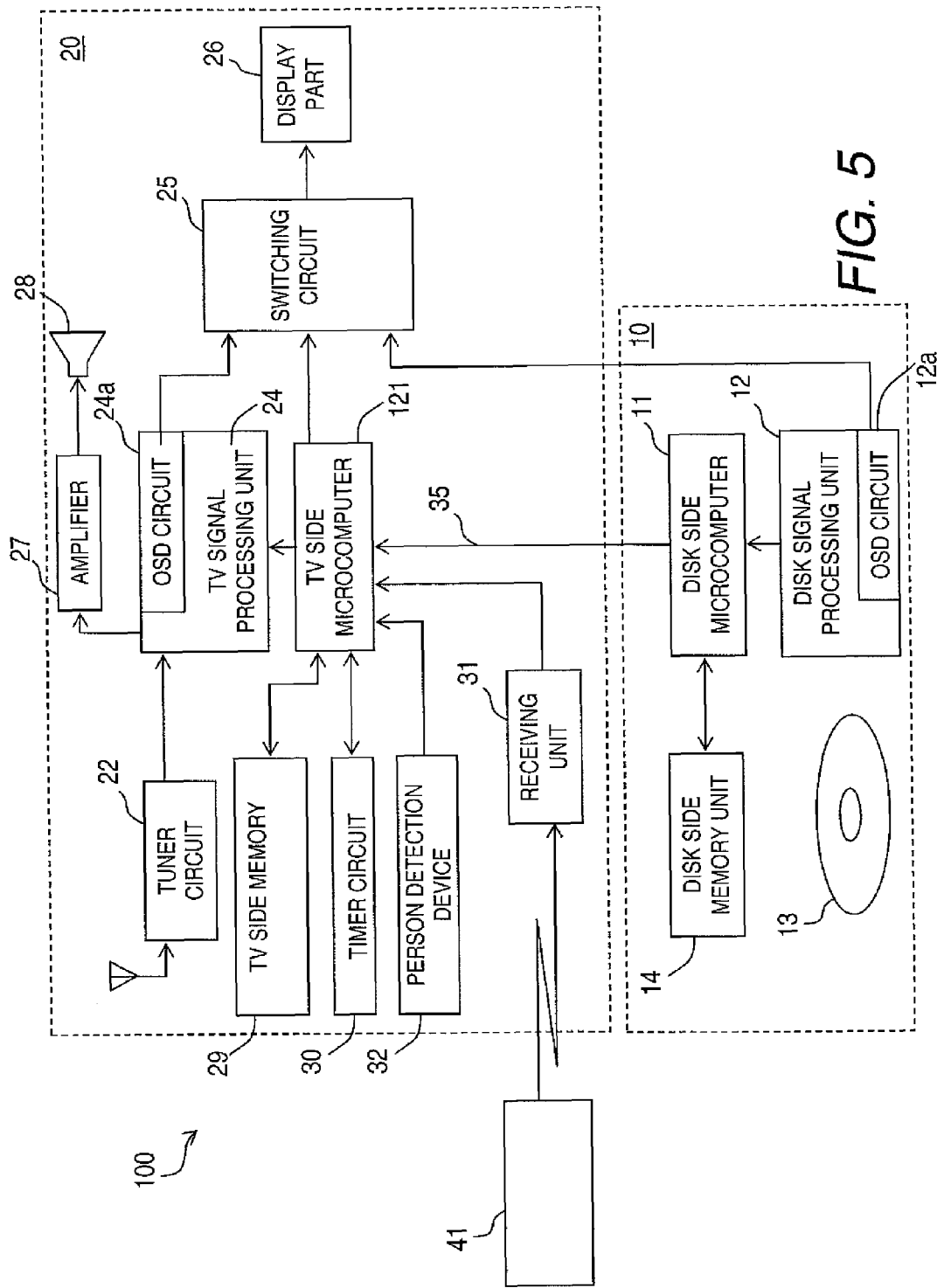
FIG. 5 is a functional block diagram of a television receiving device pertaining to a second embodiment of the present invention.
Figure 6:
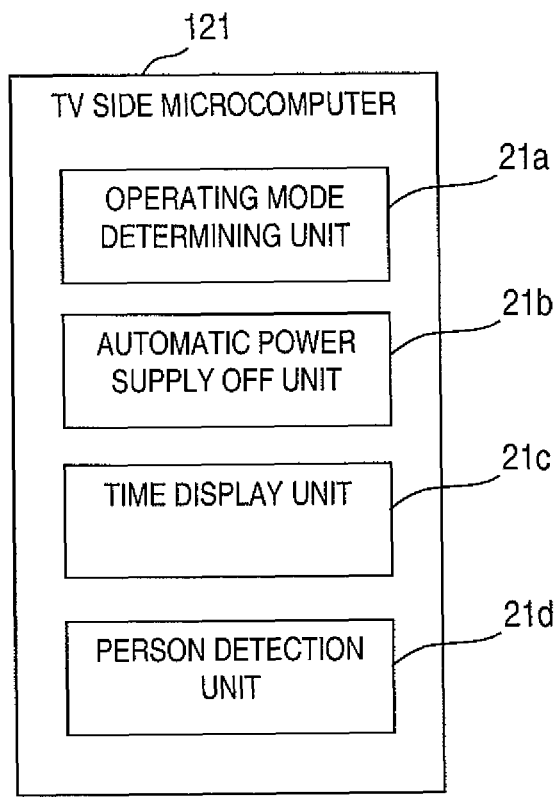
FIG. 6 is a block diagram showing a functional configuration of a TV side microcomputer pertaining to the second embodiment of the present invention.
Figure 7:
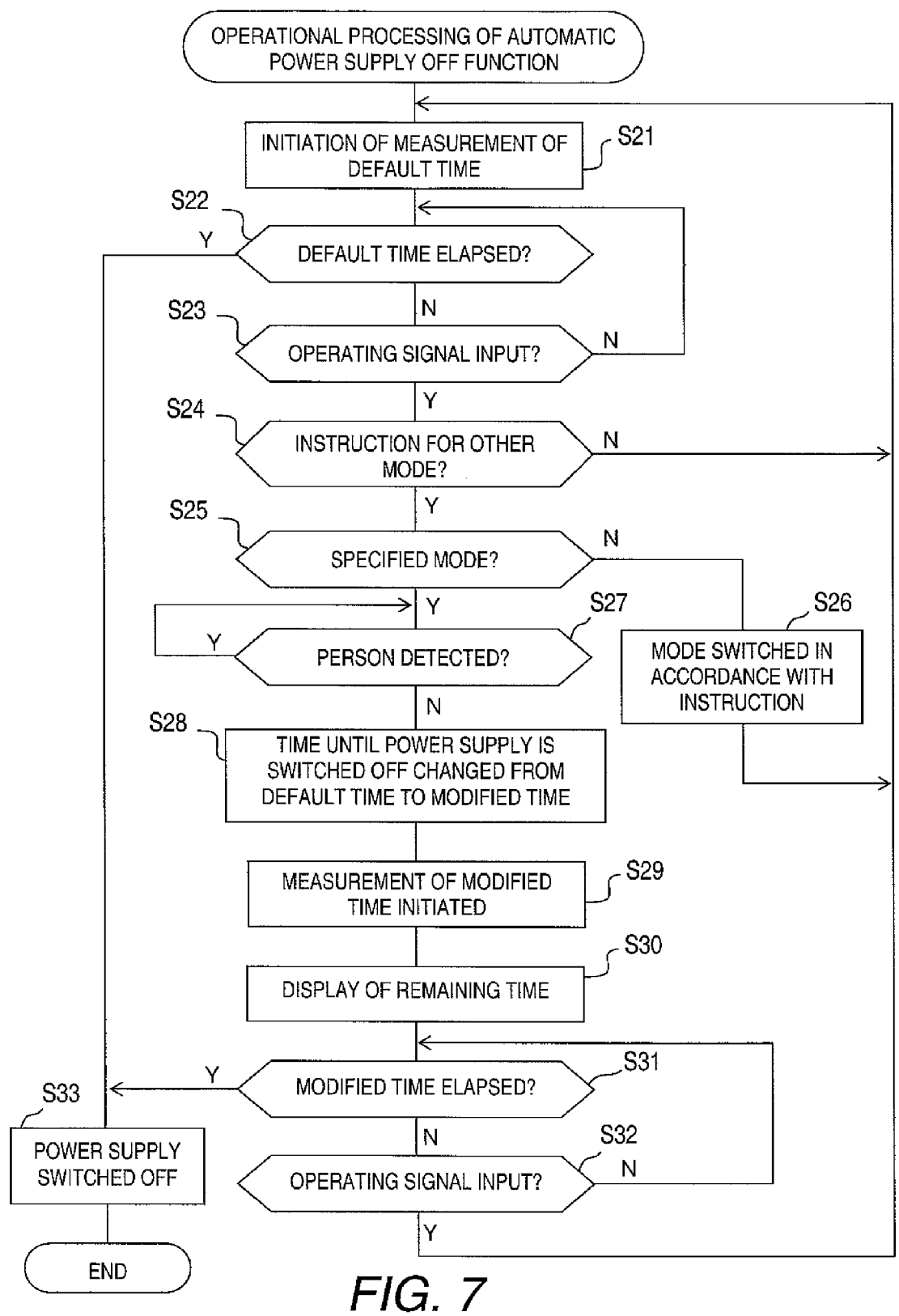
FIG. 7 is a flow chart illustrating an operation of an automatic power supply OFF function pertaining to the second embodiment of the present invention.

Referring now to FIGS. 5 to 7, a television receiving device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIG. 5, a television receiving device 100 further includes a person detection device 32. The construction of the functional blocks other than the person detection device 32 and the TV side microcomputer 121 is the same as the television receiving device 1 shown in FIG. 1.

The person detection device 32 is a device such as an infrared sensor or an image recognition device which has an imaging camera (CCD camera). The TV side microcomputer 121 detects a person by recognizing characteristic features of the person on the basis of images acquired by the person detection device 32. Specifically, an outline of a face is identified on the basis of an acquired facial image. Then, the TV side microcomputer 121 determines whether or not the image is a person by detecting positions of eyes, nose, mouth, eyebrows, and other features within the facial outline. A conventional technique is used as an image recognition technique. Therefore, a detailed description is omitted here.

The television receiving device 100 has an automatic power supply OFF function. The automatic power supply OFF function automatically switches power supply of the television receiving device 100 OFF when the default time (e.g. 3 hours) has elapsed without any operation being performed by the remote control 41 while the power supply is ON. The default time is set in advance as a time until the power supply is switched OFF. The automatic power supply OFF function is executed by the TV side microcomputer 121.

FIG. 6 is a block diagram showing a functional configuration of the TV side microcomputer 121. As shown in FIG. 6, the TV side microcomputer 121 further includes a person detection unit 21d in addition to the operating mode determining unit 21a, the automatic power supply OFF unit 21b and the time display unit 21c. The person detection unit 21d detects a person in a vicinity of the television receiving device 100 based on images acquired by the person detection device 32. The automatic power supply OFF unit 21b does not change the default time to the modified time when the person detection unit 21d detects a person in the vicinity of the television receiving device 100. On the other hand, the automatic power supply OFF unit 21b changes the default time to the modified time when the person detection unit 21d no longer detects a person in the vicinity of the television receiving device 100. These units are implemented by a program executed by the TV side microcomputer 121.

The automatic power supply OFF function will be described with reference to a flow chart shown in FIG. 7.

When the automatic power supply OFF function is started, the automatic power supply OFF unit 21b starts the timer circuit 30, and initiates the measurement of the default time of 3 hours (steps S21, S22). Here, it is assumed that the operating mode when the power supply is ON is the ordinary operating mode. In this case, the automatic power supply OFF unit 21b stands by for the operating signals from the remote control 41 (step S23). When an operating signal is input (received by the receiving unit 31) (i.e., when a judgment of YES is made in step S23), the operating mode determining unit 21a determines whether or not an instruction based on the operating signal is an instruction to switch from the ordinary operating mode to other operating mode (step S24). If there is no instruction to switch to the other operating mode, such as an instruction for adjustment of audio volume or the like (i.e., when a judgment of NO is made in step S24), the processing returns to step S21. Then, the timer circuit 30 is temporarily reset, and the measurement of the default time is again initiated.

On the other hand, when the instruction based on the operating signal is an instruction to switch to the other operating mode (i.e., when a judgment of YES is made in step S24), the operating mode determining unit 21a determines whether or not the other operating mode is the specified mode (step S25). If the other operating mode is not the specified mode (i.e., when a judgment of NO is made in step S25), a switch is made to the other operating mode designated by the instruction, and processing is performed (step S26). After the processing returns to step S21, the timer circuit 30 is temporarily reset, and the measurement of the default time is again initiated.

On the other hand, when a judgment of YES is made in step S25, the processing is advanced to step S27. Specifically, the person detection unit 21d detects whether or not a person is present in the vicinity of the television receiving device 100 using the person detection device 32.

If it is judged that a person is not present in the vicinity of the television receiving device 100 (i.e., when a judgment of NO is made in step S27), the automatic power supply OFF unit 21b changes the default time to the modified time. Then, the automatic power supply OFF unit 21b resets the timer circuit 30, and newly initiates the measurement of the modified time (step S29).

Furthermore, from this point in time, the time display unit 21c displays the remaining time remaining until the power supply is switched OFF on the screen of the display unit 26 (step S30). The display of the remaining time in this case is the same as in the case of the first embodiment.

The automatic power supply OFF unit 21b continues to measure the modified time while the time display unit 21c performs such a display of the remaining time (step S31). Furthermore, the automatic power supply OFF unit 21b monitors whether or not an operating signal is input within the measured time (step S32). If an operating signal is input within the measured time (i.e., when a judgment of NO is made in step S31, and a judgment of YES is made in step S32), processing according to the operating signal is performed. Then, the processing returns to step S21. After that, the timer circuit 30 is reset, and the measurement of the default time of 3 hours is again initiated.

On the other hand, if the modified time of 5 minutes is measured without any operating signal being input (i.e., when a judgment of YES is made in step S31), the automatic power supply OFF unit 21b switches the power supply OFF (step S33). Specifically, if no operation is performed after the operating mode is shifted to the specified mode, the power supply is automatically switched OFF after 5 minutes.

With the television receiving device 100, it is possible to make a more accurate decision as to whether or not a person is present in front of the device. Accordingly, the default time is more suitably changed to the modified time.

For example, when images alone are displayed in the audio mute mode, it is conceivable that the user talks on the telephone while watching the screen. In this case, the user often wishes to answer the telephone while viewing only the images of a movie broadcast in real time. In such cases, if the power supply is abruptly switched OFF when the modified time, e.g., 5 minutes, has elapsed, the user is prevented from viewing the video. With the television receiving device 100, it is judged on the basis of the detection results of the person detection unit 21*d* that a person is present in front of the television receiving device 100 even though the television receiving device is in the specified mode. In other words, the default time will not be changed to the modified time. Accordingly, the occurrence of an unexpected event in which the power supply ends up being switched OFF despite the user being present in front of the device is prevented.

Other Embodiments

In the first and second embodiments, the modified time may be set separately in accordance with the menu screen display mode, the audio mute mode, or the still image display mode. For example, the modified time may be set in accordance with the respective modes, e.g., at 2 minutes in the case of the menu screen display mode, 3 minutes in the case of the still image display mode, and 5 minutes in the case of the audio mute mode. Furthermore, such time settings may also be arbitrarily set by the user. As a result, an optimal time until the power supply is switched OFF can be set in accordance with the use conditions of individual users.

The television receiving devices 1 and 100 include an internal disk device such as a DVD device. However, the television receiving device of the present invention may be a television receiving device with an internal hard disk drive (HDD). Furthermore, the television receiving device of the present invention may also be an ordinary television receiving device which does not include an internal DVD device or hard disk drive (HDD). In this case, the still image display mode may be a mode to display a still image which is captured from the television signals and stored in the TV side memory 29

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A television receiving device comprising:
an operating mode determining unit configured to determine an operating mode of the television receiving device; and
a power supply control unit configured to automatically turn off the television receiving device in response to a default time elapsing, the power supply control unit further configured to change the default time to a modified time that is shorter than the default time based on the operating mode determined by the operating mode determining unit; and
a person detecting unit configured to detect presence of person in a vicinity of the television receiving device using a device other than a remote control even in case of absence of a user operation of the remote control,
the operating mode determining unit being configured to determine whether the operating mode is shifted from an ordinary operating mode in which the television receiving device outputs video and audio to a specified mode in response to the user operation of the remote control before the default time elapses,
wherein the specified mode is a mode in which there is little possibility of long-term non-operation;
wherein the specified mode includes a menu screen display mode in which a menu screen is displayed on the television receiving device, an audio mute mode in which audio output is muted, or a still image display mode in which a still image is displayed on the television receiving device;
the power supply control unit being configured to change the default time to the modified time in response to the operating mode determining unit determining that the operating mode is shifted from the ordinary operating mode to the specified mode by the user operation of the remote control, and
the power supply control unit being configured to restart measurement of the default time in response to the operating mode determining unit determining that the operating mode is shifted from the ordinary operating mode to a mode other than the specified mode by the user operation of the remote control,
the power supply control unit being further configured to turn off the television receiving device in response to the default time elapsing without any user operations of the remote control to the television receiving device being performed,
the power supply control unit being further configured not to change the default time to the modified time while the person detecting unit detects the presence of person in the vicinity of the television receiving device using the device other than the remote control,
the power supply control unit being further configured to change the default time to the modified time after the person detecting unit no longer detects the presence of person in the vicinity of the television receiving device.

2. The television receiving device according to claim 1, wherein
the ordinary operating mode includes a mode in which the television receiving device outputs the video and the audio which are being broadcasted.

3. The television receiving device according to claim 1 further comprising
a time display unit configured to display a remaining time until the television receiving device is automatically turned off when the operating mode determining unit determines that the operating mode is shifted from the ordinary mode to the specified mode.

4. A power supply control method for controlling a power supply to a television receiving device comprising:

determining an operating mode of the television receiving device;

turning off the television receiving device automatically in response to a default time elapsing;

changing the default time to a modified time that is shorter than the default time based on the operating mode;

detecting presence of person in a vicinity of the television receiving device using a device other than a remote control even in case of absence of a user operation of the remote control; and restarting measurement of the default time based on the operating mode, the determining of the operating mode further including determining whether the operating mode is shifted from an ordinary operating mode in which the television receiving device outputs video and audio to a specified mode in response to the user operation of the remote control before the default time elapses, wherein the specified mode is a mode in which there is little possibility of long-term non-operation;

wherein the specified mode includes a menu screen display mode in which a menu screen is displayed on the television receiving device, an audio mute mode in which audio output is muted, or a still image display mode in which a still image is displayed on the television receiving device;

the changing of the default time to the modified time further including changing the default time to the modified time in response to determining that the operating mode is shifted from the ordinary operating mode to the specified mode by the user operation of the remote control, and the restarting of the measurement of the default time further including restarting the measurement of the default time in response to determining that the operating mode is shifted from the ordinary operating mode to a mode other than the specified mode by the user operation of the remote control, the turning off of the television receiving device further including turning off the television receiving device in response to the default time elapsing without any user operations of the remote control to the television receiving device being performed, the changing of the default time to the modified time further including not changing the default time to the modified time while detecting the presence of person in the vicinity of the television receiving device using the device other than the remote control, the changing of the default time to the modified time further including changing the default time to the modified time after no longer detecting the presence of person in the vicinity of the television receiving device.

5. The television receiving device according to claim 1, wherein the person detecting unit is configured to detect the presence of person in the vicinity of the television receiving device using one of an infrared sensor and an image recognition device with an imaging camera as the device other than the remote control.

* * * * *